United States Patent [19]
Gilbertson

[11] Patent Number: 6,134,885
[45] Date of Patent: Oct. 24, 2000

[54] EXHAUST SYSTEM TUNED FOR PERFORMANCE WITH SHARED WALL

[76] Inventor: Gary G. Gilbertson, N7677 Peebles La., Fond du Lac, Wis. 54935

[21] Appl. No.: 09/039,505

[22] Filed: Mar. 16, 1998

[51] Int. Cl.[7] ....................................................... F01N 7/00
[52] U.S. Cl. ................................ 60/312; 60/313; 60/314; 60/322; 60/324; 181/228
[58] Field of Search ............................ 60/312, 313, 314, 60/305, 322, 323, 324; 181/228, 204, 227

[56] References Cited

U.S. PATENT DOCUMENTS

| | | | |
|---|---|---|---|
| 3,453,824 | 7/1969 | Biesecker | 60/313 |
| 3,786,791 | 1/1974 | Richardson | 123/65 |
| 4,912,930 | 4/1990 | Ueda | 60/324 |
| 5,044,159 | 9/1991 | Landfahrer et al. | 60/314 |
| 5,216,883 | 6/1993 | Flugger | 60/313 |

FOREIGN PATENT DOCUMENTS

| | | | |
|---|---|---|---|
| 8603256 | 6/1986 | European Pat. Off. | 60/313 |
| 473081 | 3/1992 | European Pat. Off. | |
| 186908 | 8/1988 | Japan | |

OTHER PUBLICATIONS

Gordon P. Blair, The Basic Design of Two–Stroke Engines, 1990, pp. 67, 277, 278.
Gordon P. Blair, Design and Simulation of Two–Stroke Engines, 1996, pp. 125, 372.

*Primary Examiner*—Thomas Denion
*Assistant Examiner*—Binh Tran
*Attorney, Agent, or Firm*—Donald Cayen

[57] ABSTRACT

An exhaust pipe for an internal combustion engine has non-circular passages that extend from the engine exhaust port to the atmosphere. The performance of the engine is not impaired by the non-circular passages compared with prior pipes having circular passages of the same cross sectional areas at corresponding locations along the pipes. The non-circular cross section enables two or more passages to be located inside a single outer wall. Plates inside the outer wall divide the outer wall interior into the separate passages. Adjacent passages thus share a wall. The exhaust pipe includes headers that conduct exhaust gasses directly from the engine to the associated passages. In a modification of the invention, an exhaust pipe is tuned for performance at two different engine operating speeds by tuning a passage on one side of a shared wall differently than another passage on the other side of a shared wall.

3 Claims, 7 Drawing Sheets

EXHAUST SYSTEM TUNED FOR PERFORMANCE WITH SHARED WALL

BACKGROUND OF THE INVENTION

1. Field of the Invention.

This invention pertains to internal combustion engines, and more particularly to apparatus for conducting exhaust products from an engine cylinder to the atmosphere.

2. Description of the Prior Art.

For two reasons, the design of internal combustion engines requires that much attention be paid to their exhaust systems. First, especially for two-stroke engines, the performance of an engine is greatly affected by the exhaust system. Second, the exhaust from an engine is very noisy and must be silenced. To some degree, the desirable characteristics of high performance and low noise are incompatible with each other.

Exhaust systems for internal combustion engines are very complicated, both because of the dynamics of the gasses and because of space constraints. Many small two-stroke industrial engines have severe limitations on the amount of space available for the exhaust systems. In those cases, the available space is usually taken up almost entirely by silencing components, often to the detriment of engine performance.

On the other hand, high performance engines such as are used on motorcycles and snowmobiles usually have more space available for the exhaust systems. Even with high performance engines, however, it is a difficult task to design a performance enhancing, quiet, and aesthetically pleasing exhaust system.

It is well known that pressure waves of the exhaust gasses reflect at a change in cross section of an exhaust pipe. It is further known to take advantage of the pressure wave reflections to tune the exhaust system in a manner that enhances engine performance. Particularly, exhaust systems are designed such that exhaust pulses from the engine are reflected cyclically back to the engine exhaust port. For a portion of each cycle, the exhaust pulse is reflected as an expansion wave that assists in scavaging the engine cylinder. For another portion of the cycle, the exhaust pulse is reflected back to the exhaust port as a compression wave that serves to hold the fresh charge in the cylinder.

Another complicating factor in the design of exhaust systems is that a particular design is optimum for only a narrow range of operating speeds. Accordingly, an exhaust system that is tuned for a particular engine and speed will not be the optimum system for the same engine at a different speed. To date, size and space limitations have made it impractical to equip an engine with an exhaust system that is optimum for more than one operating speed.

The design of two-stroke engines is discussed at length in the books "The Basic Design of Two-Stroke Engines" and "Design and Simulation of Two-Stroke Engines", both by Gordon P. Blair and published by the Society of Automotive Engineers in 1990 and 1996, respectively. Both books include the scientific and engineering aspects of two-stroke engines, including their exhaust systems.

The book "Four-Stroke Performance Tuning" by A. Graham Bell, Haynes Publishing, copyright 1991, includes a chapter on exhaust systems. V. P. Engineering Inc. & Audie Technology Inc. have developed computer programs that simulate exhaust dynamics in four-stroke engines. One such program is entitled "Dynomation Four Cycle Wave Action Simulator," copyright 1994.

A common characteristic of all known literature on the topic of internal combustion engine exhaust systems is that the cross sections of the exhaust passages are described as being round for their full lengths. For example, the above-mentioned book by Bell gives formulas for the size of exhaust pipes that are based on pipe diameters. In practice, because of manufacturing limitations, the cross sectional shapes of some exhaust pipes had been slightly elliptical in cross section. Although elliptical exhaust passages were sometimes tolerated by engine manufacturers, the consensus was that they compromised overall engine performance.

Figure 1:
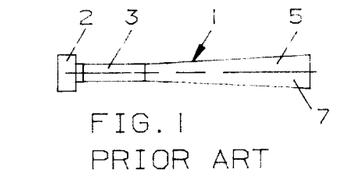
FIG. 1 is a front view of a typical prior exhaust pipe for a four-stroke engine.
Figure 2:
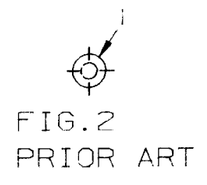
FIG. 2 is an end view of FIG. 1.

To tune an exhaust system for performance, the desired engine speed was chosen. An exhaust pipe was designed that had discrete sections of different lengths and diameters chosen to suit the particular engine and operating speed. The diameters of the various sections may be constant or variable along their lengths, i.e., the sections may be cylindrical or conical. FIGS. 1 and 2 show an ideal prior tuned exhaust pipe 1 for a single-cylinder four-stroke engine 2. The exhaust pipe 1 is duplicated for each cylinder of a multi-cylinder engine. The exhaust pipe has a header 3 and a megaphone section 5, both of which are circular in cross section and symmetrical about a straight longitudinal axis 7. Exhaust pulses from the engine 2 are reflected back as expansion waves in the megaphone section 5.

Figure 3:
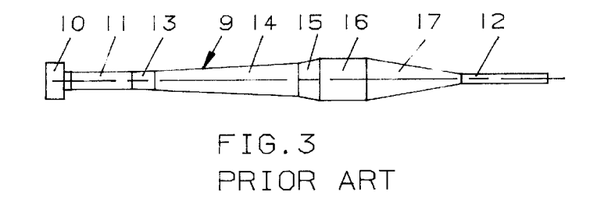
FIG. 3 is a front view of a typical prior exhaust pipe for a two-stroke engine.
Figure 4:
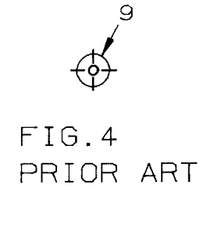
FIG. 4 is an end view of FIG. 3.

FIGS. 3 and 4 show a typical prior exhaust pipe 9 tuned for performance for a two-stroke engine 10. The expansion pipe 9 has a header 11 at the inlet end and a stinger 12 at the outlet end. Between the header 11 and the stinger 12 are intermediate sections 13, 14, 15, 16, and 17. In the particular exhaust 9 pipe shown, pulses from the engine 10 are reflected back as expansion waves within the sections 13, 14, and 15, and as compression waves in the section 17.

Figure 9:
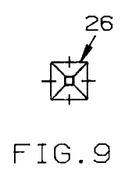
FIG. 9 is a second end view of FIG. 7.
Figure 10:
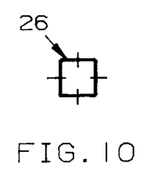
FIG. 10 is a cross sectional view taken along line 10—10 of FIG. 7.
Figure 11:
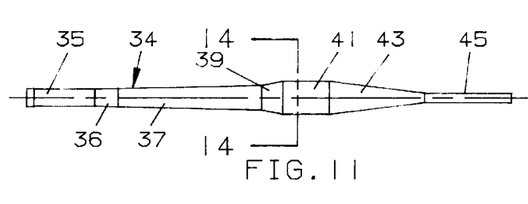
FIG. 11 is a front view of an alternate configuration of the invention.
Figure 12:
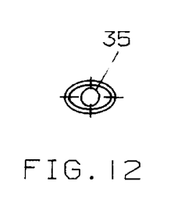
FIG. 12 is a first end view of FIG. 11.
Figure 13:
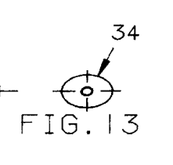
FIG. 13 is a second end view of FIG. 11.
Figure 14:
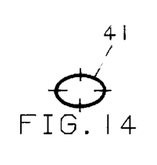
FIG. 14 is a cross sectional view taken along line 14—14 of FIG. 11.

In practice, the ideal exhaust pipes 1 and 9 can rarely, if ever, be used. That is because space considerations on the vehicle propelled by the engine, such as a snowmobile or motorcycle, usually dictate that the pipe be curved in some fashion, often in a U-shape. U.S. Pat. No. 4,285,109 describes a method suitable for manufacturing a curved exhaust pipe.

Figure 5:
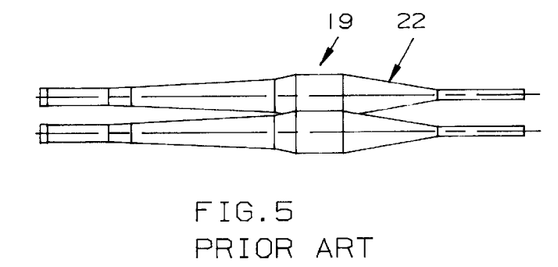
FIG. 5 is a front view of a typical prior exhaust system for a three-cylinder two-stroke engine.
Figure 6:
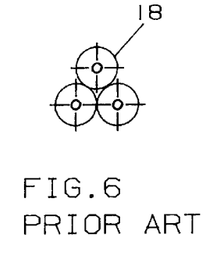
FIG. 6 is an end view of FIG. 5.
Figure 7:
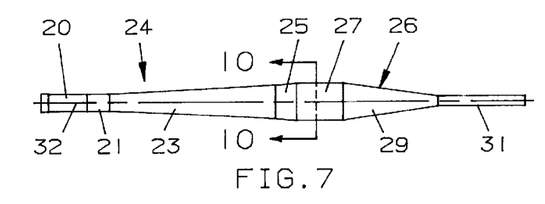
FIG. 7 is a front view of an exhaust pipe tuned for performance for a single-cylinder two-stroke engine according to the invention.
Figure 8:
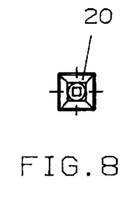
FIG. 8 is a first end view of FIG. 7.

Another factor that complicates the design of engine exhaust systems is the fact that most engines have more than one cylinder and consequently more than one exhaust pipe. The problem of finding space on a vehicle for multiple exhaust pipes can be difficult to solve, particularly when aesthetics are important. The envelope of multiple properly tuned exhaust pipes occupies a significant amount of space on the vehicle. FIGS. 5 and 6 show a typical prior tuned exhaust system 19 for a three-cylinder two-stroke engine. It will be appreciated that there is considerable wasted space within the three-lobe envelope 18 of the three individual exhaust pipes 22 of the system 19.

SUMMARY OF THE INVENTION

In accordance with the present invention, a tuned exhaust system for multi-cylinder internal combustion engines is provided that is more compact and economical than prior systems. This is accomplished by constructing the exhaust system with shared walls between exhaust passages.

The invention is based on my discovery that it is the area, not the shape, of the cross sections along the engine exhaust passage that is the determining factor in exhaust system performance. All known prior art in the field of exhaust systems tuned for performance teaches circular cross sections for all the sections of exhaust pipes. My discovery, on the other hand, is an exhaust system tuned for performance in which the pipe sections corresponding to the respective sections of a comparable prior pipe have the same areas as the prior pipe but have non-circular cross sections. Further, the cross sections according to my invention do not have to be symmetrical about any longitudinal axis through the cross section.

The ability to use non-circular cross sections allows great flexibility in designing exhaust systems. For example, it is now possible to use a shared wall between two passages inside a single pipe. Specifically, an exhaust pipe for a three-cylinder two-stroke engine can have a circular outer wall of varying diameters at different sections along its length. Three plates are placed radially inside the outer wall so as to divide the interior into three sector-shaped passages. Each of the passages has a shared wall with each of the other two passages. Consequently, there is a significant savings in material with the exhaust system of the invention compared with a comparable prior system of three individual pipes. In some applications, it may be desirable to have an outer wall that is not round. The invention contemplates such configurations. Generally, the cross section of a pipe may be of practically any shape provided the peripheral length of the outer wall is not so large relative to the area that excessive gaseous friction exists along the outer wall. Further, an exhaust pipe having multiple passages within one outer wall can be curved to suit particular applications, just as prior single-passage circular cross section exhaust pipes.

Experimental results with exhaust systems manufactured according to the invention are highly favorable. The performance of exhaust pipes having two and three non-circular passages is at least as high as prior exhaust pipes having circular cross section passages of the same area. By increasing the size of the envelope of a multi-passage system according to the invention to approach the size of a comparable prior system, the performance of the system of the invention is increased over that of the prior system. Thus, for the same space occupied in a vehicle, an engine that utilizes the tuned exhaust system of the invention has higher performance than prior engines.

The design flexibility afforded by the invention makes practical an exhaust system that is tuned for optimum performance at more than one speed of an engine. Each cylinder of the engine can have an exhaust pipe that has two passages separated by a shared wall. Each passage can be individually tuned for optimum performance at a particular speed by having its own outer wall with the required section lengths and areas. A valve or the like directs the cylinder exhaust to the correct passage as a function of the engine speed.

The method and apparatus of the invention, using non-circular cross sections for multiple exhaust passages separated by shared walls, thus reduces cost and space compared with prior exhaust systems. The exhaust system can be packaged more aesthetically than prior systems, even though engine performance is not diminished.

Other advantages, benefits, and features of the present invention will become apparent to those skilled in the art upon reading the detailed description of the invention.

BRIEF DESCRIPTION OF THE DRAWINGS

FIG. 16A is a second end view of FIG. 15.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 7–10, a typical embodiment of an exhaust system 24 for a two-stroke engine according to the present invention is illustrated. The exhaust system 24 comprises a single pipe 26 that is for a particular two-stroke engine, not shown, and that is tuned for optimum performance at a specific speed of the engine. For that purpose, the exhaust pipe 26 has a header 20 and sections 21, 23, 25, 27, 29, and 31 of different lengths and non-circular cross sectional areas. As illustrated, all the sections are square in cross section and are thus symmetrical about a longitudinal axis 32 through the centroid of the cross sectional areas.

With proper design, the exhaust pipe 26 can be substituted for the exhaust pipe 9 of FIGS. 3 and 4. In that case, the header 20 of the pipe 26 would have the same length and cross sectional area as the header 11 of the pipe 9. Similarly, the sections 21, 23, 25, 27, 29, and 31 would have the same lengths and areas as the sections 13, 14, 15, 16, 17, and 12, respectively.

It is a feature of the invention that the cross sectional areas of the exhaust pipe sections need not be symmetrical about any longitudinal axis through the cross section. A more general version of the exhaust system of the invention is shown in FIGS. 11–14. Those Figures depict a single pipe 34 that has elliptical cross sections. The pipe 34 is tuned to replace either the exhaust pipe 9 of FIGS. 3 and 4 or the exhaust pipe 26 of FIGS. 7–10. Accordingly, the exhaust pipe 34 has a header 35 and sections 36, 37, 39, 41, 43, 45 that have the same lengths and cross sectional areas as the headers 11 and 20, and sections 13 and 21, 14 and 23, 15 and 25, 16 and 27, 17 and 29, and 12 and 31, respectively.

Figure 15:
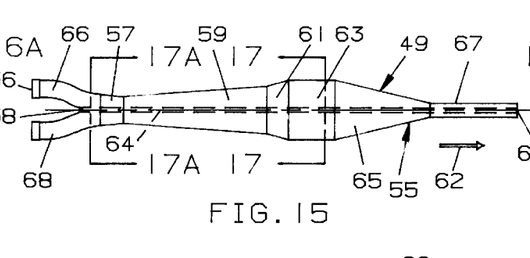
FIG. 15 is a front view of an exhaust pipe that has two passages separated by a shared wall.
Figure 16:
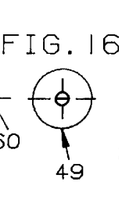
FIG. 16 is a first end view of FIG. 15.
Figure 17:
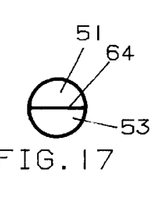
FIG. 17 is a cross sectional view taken along line 17—17 of FIG. 15.
Figure 17A:
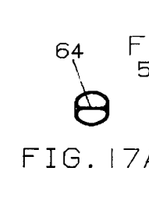
FIG. 17A is a cross sectional view taken along line 17A—17A of FIG. 15.

The versatility of the invention is further demonstrated at FIGS. 15–17. Those Figures show an exhaust pipe 49 that contains two separate passages 51 and 53, one for each cylinder of a two-cylinder two-stroke engine. The exhaust pipe 49 comprises two headers 66 and 68 that blend smoothly into a circular outer wall 55. The outer wall 55 has a number of sections 57, 59, 61, 63, 65, and 67 of different lengths and cross sectional areas. A plate 64 extends inside the outer wall from the pipe downstream end 60 to the upstream junction 58 of the headers 66 and 68. The plate 64 divides the pipe interior into the two equal area passages 51 and 53. The plate 64 thus serves as a shared wall between the two passages. The exhaust header 66 from one cylinder of the engine leads directly to the passage 51. The other header 68 leads directly from the engine to the passage 53. To provide a smooth transition between the circular upstream ends 56 of the headers (FIG. 16A) and the non-circular passages 51 and 53, the headers are fabricated with gradually changing cross sectional shapes. Specifically, the cross section of the headers gradually changes from circular to elliptical. At the junction 58, the headers make use of the plate 64 as a shared wall between the headers. In that manner, separate passages for the two-cylinder engine are incorporated into the single circular envelope of the outer wall 55, and there is no mixing of the exhaust gasses from the engine cylinders as the gasses flow in the downstream direction 62 from the engine to the atmosphere.

The exhaust pipe 49 can be tuned for performance to replace the two prior individual exhaust pipes of a two-cylinder engine. For example, the exhaust pipe 49 can be tuned to replace two exhaust pipes 9, FIGS. 3 and 4. In that case, the lengths and cross sectional areas of the headers 66 and 68 from their upstream ends 56 to the upstream end of the pipe section 57 are the same as for the header 11 of the pipe 9. The lengths of the sections 57, 59, 61, 63, 65, 67 are the same as the lengths of the corresponding sections of the individual exhaust pipes 9. Further, the total of the cross sectional areas of the single pipe passages 51 and 53 at each of the sections 57, 59, 61, 63, 65, 67 is equal to the total of the cross sectional areas of the two individual exhaust pipes 9 at each of the respective corresponding sections. It is because non-circular cross sectional areas function satisfactorily that the two passages 51 and 53 can be incorporated into the single circular outer wall 55 by using the shared wall 64.

It will be noticed that the multi-passage exhaust pipe 49 possesses several advantages over two individual pipes 9 (FIGS. 3 and 4). For passages 51 and 53 that are equal in cross sectional areas to that of the pipe 9, the envelope of the outer wall 55 is less than the envelope of two individual pipes. See FIG. 18. In addition, because of the shared wall 64, the weight and therefore cost of the exhaust pipe 49 is less than that of two individual pipes 9.

Figures 18, 19, 20, 20A, 21, 21A, 22:
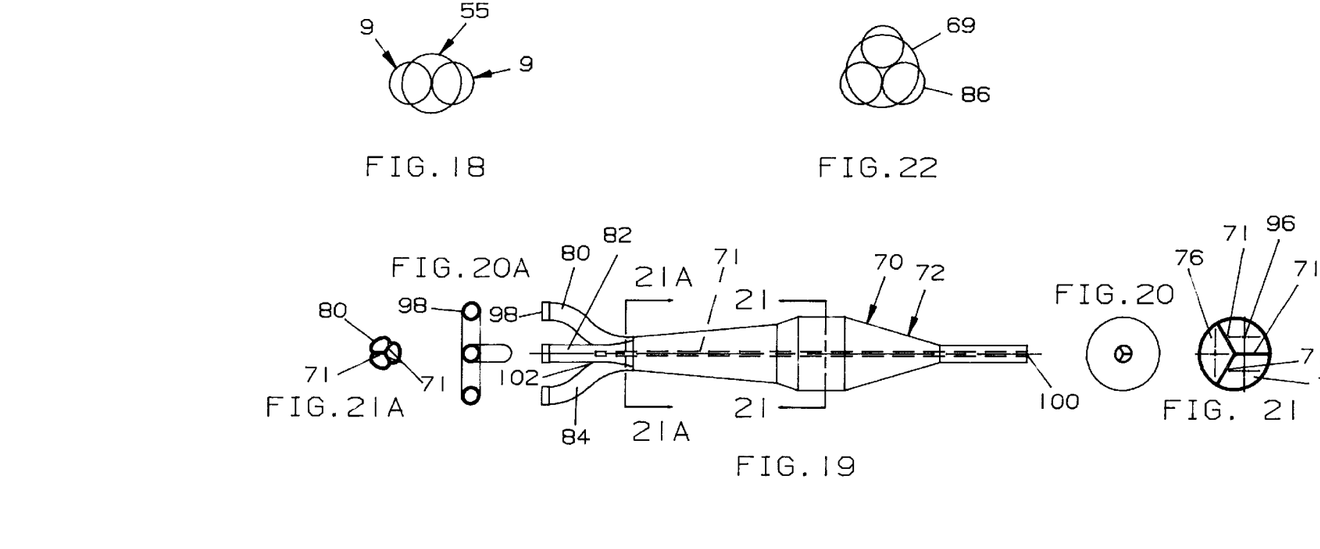
FIG. 18 is an outline of the envelope of a prior exhaust system having two individual pipes and of the envelope using an equivalent exhaust system according to the present invention.
FIG. 19 is a front view of an exhaust pipe that has three passages separated by shared walls.
FIG. 20 is a first end view of FIG. 19.
FIG. 20A is a second end view of FIG. 19.
FIG. 21 is a cross sectional view taken along line 21—21 of FIG. 19.
FIG. 21A is a cross sectional view taken along line 21A—21A of FIG. 19.
FIG. 22 is an outline of the envelope of a prior exhaust system having three individual pipes and of the envelope of an equivalent exhaust system according to the present invention.

FIGS. 19–21 show an exhaust pipe 72 according to the invention for a three-cylinder two-stroke engine. The exhaust pipe 72 has a circular outer wall of different diameters represented generally at reference numeral 70. Three headers 80, 82, and 84, which are circular at their upstream ends 98, blend smoothly into the outer wall 70. Three radial plates 71 inside the outer wall 70 extend longitudinally from the pipe downstream end 100 to the upstream junction 102 of the headers 80, 82, 84. The plates 71 divide the interior of the outer wall into three separate passages 74, 76, and 78. Each plate serves as a shared wall between two adjacent passages. Each passage 74, 76, 78 is connected directly to an engine cylinder by headers 80, 82, 84, respectively. The headers 80, 82, 84 are fabricated to provide smooth transitions from their upstream ends 98 to the outer wall 70. For that purpose, the headers change in cross section from circular (FIG. 20A) to elliptical. As shown in FIG. 21A, the three headers utilize the plates 71 as shared walls between the headers. The headers blend into the outer wall 70. Exhaust gasses thus flow smoothly and directly from the engine exhaust ports to the associated passages 74, 76, 78.

The exhaust pipe 72 can be tuned to give the same performance as three individual exhaust pipes 9, FIGS. 3 and 4. For that purpose, the headers 80, 82, 84 have the same lengths as the header 11. The headers 80, 82, 84 also have the same cross sectional areas along their lengths as the cross sectional area of the header 11. The various sections of the pipe 72 have the same lengths as the corresponding sections of the pipe 9. Moreover, the cross sectional areas of the various sections are the same for the passages 74, 76, 78 as for the areas of the corresponding sections of the pipe 9.

FIG. 22 shows the envelope 69 of the three-passage exhaust pipe 72 according to the invention compared with the envelope 86 of three prior individual pipes 9. It is readily apparent that envelope 69 is smaller than the envelope 86. Further, the weight and cost of the three-passage pipe 72 is less than that of three individual pipes 9. That is because each of the plates 71 serves as a shared wall between two adjacent passages.

As discussed previously, an exhaust system constructed according to the present invention need not be symmetrical about any longitudinal axis through the cross sectional areas of the passages. The exhaust pipe 72 demonstrates that characteristic very well. None of the passages 74, 76, 78 is symmetrical about any longitudinal axis of those passages. For example, the passages are asymmetrical about the longitudinal axes 96 through the centroids of the respective cross sectional areas.

Another major advantage of the shared wall pipes of the invention is that the exhaust gasses remain hotter for a longer time compared with prior single passage pipes. That is because the area of the pipe exposed to the cooling atmosphere is reduced with the multi-passage pipes compared with prior single-passage pipes. Consequently, the exhaust system of the invention is ideal for use with catalytic converters, which can be located close to the center of the outer wall along the interior plates. In addition, the reduced area of the outer wall compared with prior individual pipes results in reduced noise emanating from the pipe outer wall compared with multiple prior pipes.

To manufacture a multi-passage exhaust pipe tuned for performance for a two-stroke engine, the lengths and cross sectional areas of the various sections are determined as for conventional individual pipes. An outer wall made up of the sections is fabricated by any suitable method. For example, individual cylindrical and frusto-conical tubes can be fabricated and then welded together end-to-end. Alternately, the outer wall can be made as two stampings welded together. In some cases it may be desirable to use the hydrodynamic forming method of U.S. Pat. No. 4,285,109 to fabricate the outer wall.

Figures 23, 24, 25, 26, 27, 27A, 27B:
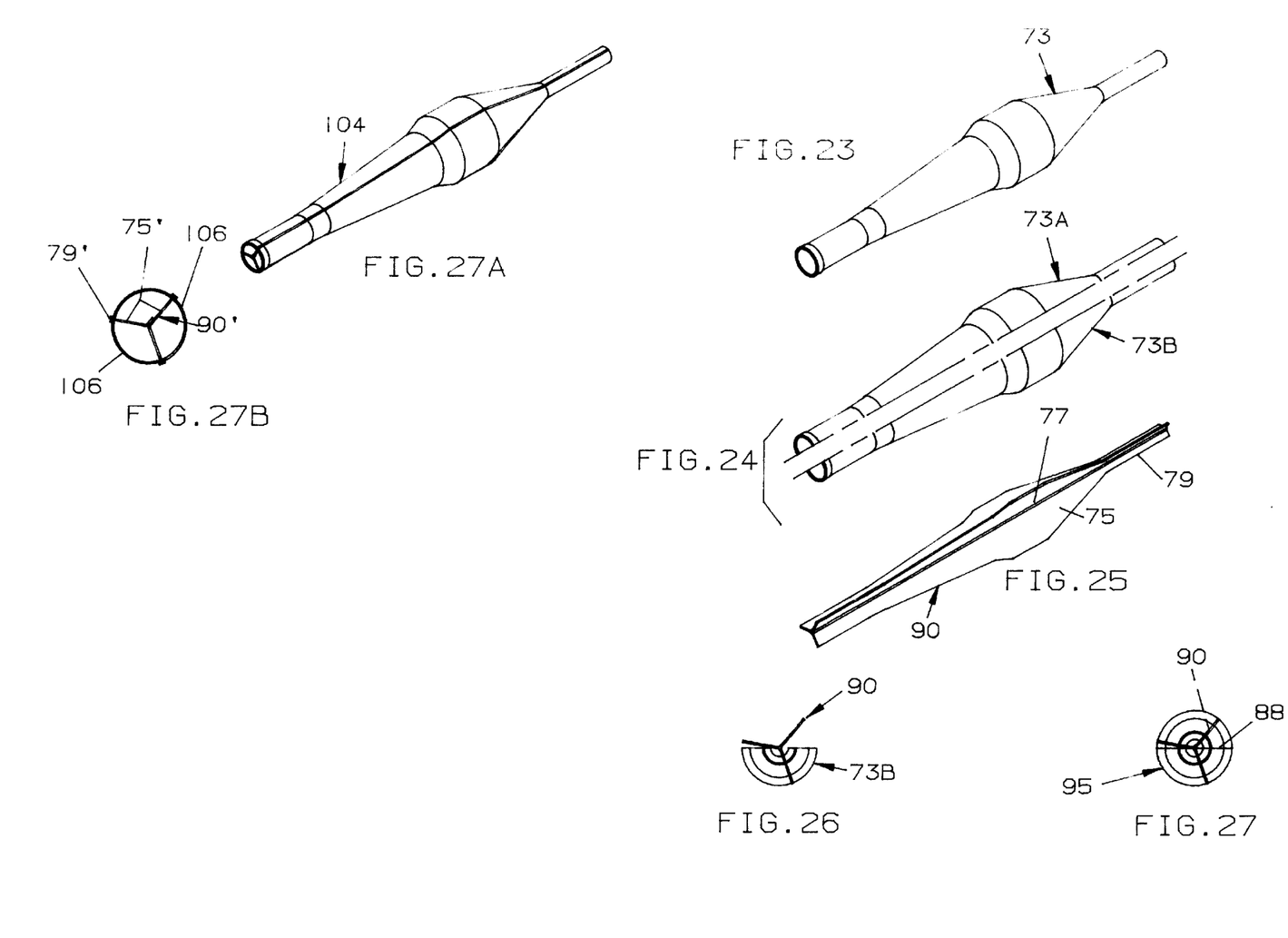
FIG. 23 is a perspective view of the outer wall of a typical exhaust pipe tuned for performance for a two-stroke engine.
FIG. 24 is a view similar to FIG. 23, but showing the exhaust pipe outer wall cut into two pieces.
FIG. 25 is a perspective view of three plates that are used with the outer wall of FIGS. 23 and 24.
FIG. 26 is an end view of a plate assembly welded to one half of the outer wall of FIGS. 23 and 24.
FIG. 27 is an end view showing the completed exhaust pipe according to the invention.
FIG. 27A is a perspective view of a typical exhaust pipe according to the invention that is manufactured using separate stampings welded to a divider.
FIG. 27B is an end view of FIG. 27A.

FIG. 23 shows an outer wall 73 of a typical two-passage exhaust pipe. The outer wall 73 is cut diametrically in two and separated into halves 73A and 73B, FIG. 24. One or more longitudinally extending plates to suit the number of cylinders of an engine are welded to the interior of the halves 73A and 73B. In FIG. 25, for example, three plates 75 are shown welded to each other. The plates 75 have respective straight first edges 77 and second edges 79. The edges 79 have varying contours to suit the contour of the outer wall 73. The three plates are welded to each other along their common straight edges 77 to make a divider 90. One plate of the divider 90 is welded along its second edge 79 to one of the halves 73A or 73B of the outer wall, FIG. 26. Then the two halves are brought together and welded along their common joint 88 and along the outer wall at the joints with the second edges 79 of the other two plates of the divider 90. See FIG. 27, which shows the completed exhaust pipe 101.

FIGS. 27A and 27B show an alternate method for constructing the exhaust pipe of the invention. In FIGS. 27A and 27B, an exhaust pipe 104 with three passages has a divider 90' with three plates 75'. Three identical arcuate stampings 106 with the proper section lengths and diameters are welded to the plates 75' along their respective edges 79'. The result is the exhaust pipe 104 that in its final appearance and performance is substantially identical to the exhaust pipe 101 of FIG. 27.

Figure 28:
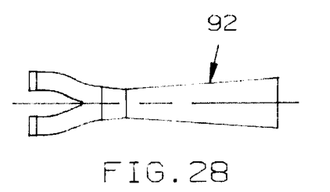
FIG. 28 is a front view of an exhaust pipe tuned for performance for a two-cylinder four-stroke engine.
Figure 29:
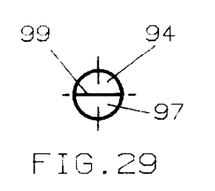
FIG. 29 is an end view of FIG. 28.

It is a feature of the present invention that it applies equally well to four-stroke engines as to two-stroke engines. FIGS. 28 and 29, for example, show an exhaust pipe 92 for a four-stroke engine that contains two different passages 94 and 97 separated by a shared wall 99. The exhaust pipe 92 can be tuned for performance to produce the same results as two individual exhaust pipes 1, FIGS. 1 and 2.

Figure 30:
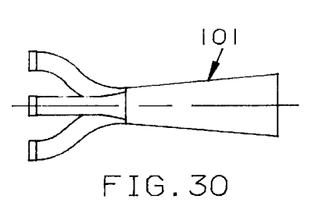
FIG. 30 is a front view of an exhaust pipe tuned for performance for a three-cylinder four-stroke engine.
Figure 31:
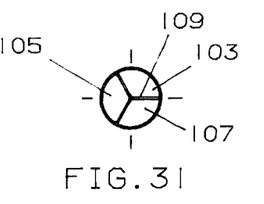
FIG. 31 is an end view of FIG. 30.
Figure 32:
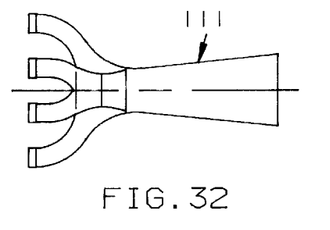
FIG. 32 is a front view of an exhaust pipe for a four-cylinder four-stroke engine.
Figure 33:
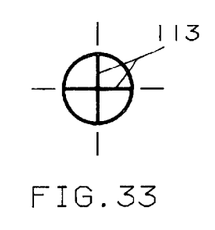
FIG. 33 is an end view of FIG. 32.
Figure 34:
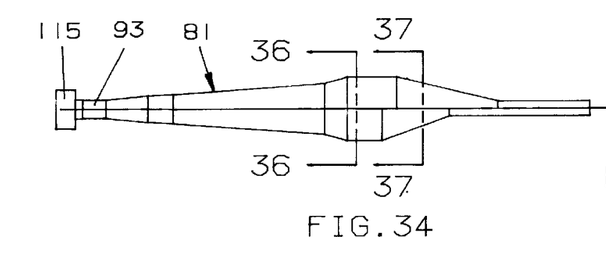
FIG. 34 is a front view of an exhaust pipe tuned for performance at two different operating speeds of a single-cylinder two-stroke engine.
Figure 35:
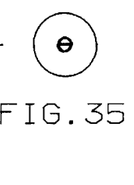
FIG. 35 is an end view of FIG. 34.
Figure 36:
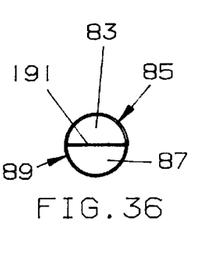
FIG. 36 is a cross sectional view taken along line 36—36 of FIG. 34.
Figure 37:
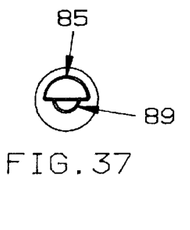
FIG. 37 is a cross sectional view taken along line 37—37 of FIG. 34.

In FIGS. 30 and 31, an exhaust pipe 101 is shown for a three-cylinder four-stroke engine. The exhaust pipe 101 has three separate passages 103, 105, 107 with shared walls 109. FIGS. 32 and 33 depict an exhaust pipe 111 for a four-cylinder four-stroke engine. The exhaust pipe 111 has four passages separated by four shared walls 113. Each of the exhaust pipes 92, 101, and 111 is tuned for performance in a manner that enables it to replace multiple individual exhaust pipes 1 of FIGS. 1 and 2.

Further in accordance with the present invention, the exhaust system can be tuned for different engine operating speeds. Looking at FIGS. 34–37, an exhaust pipe 81 is designed with two passages that are different from each other. One passage 83 is defined by a first outer wall 85 having sections with lengths and cross sectional areas necessary to tune the engine for performance at one operating speed. A second passage 87 is defined by a second outer wall 89 having sections of lengths and cross sectional areas required to tune the engine for performance at a second operating speed. A shared wall 91 separates and contributes to defining the two passages 83 and 87. A valve 115 at the header 93 of the pipe 81 directs exhaust gasses from the engine (not shown) into the appropriate passage 83 or 87 in response to changing engine speeds.

Figures 38, 39:
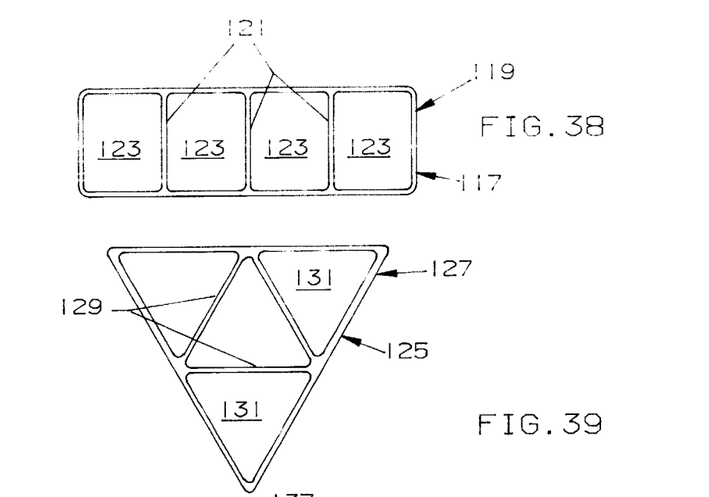
FIG. 38 is a cross sectional view showing an alternate embodiment of the invention.
FIG. 39 is a cross sectional view of a further alternate embodiment of the invention.

The versatility of the invention is further demonstrated with reference to FIGS. 38–42. FIG. 38 is a cross sectional view through a section of an exhaust pipe 117 that has a rectangular outer wall 119. Three interior walls 121 cooperate with the outer wall 119 to form four separate passages 123. Each wall 121 is shared by two passages 123.

Figures 40, 41, 42:
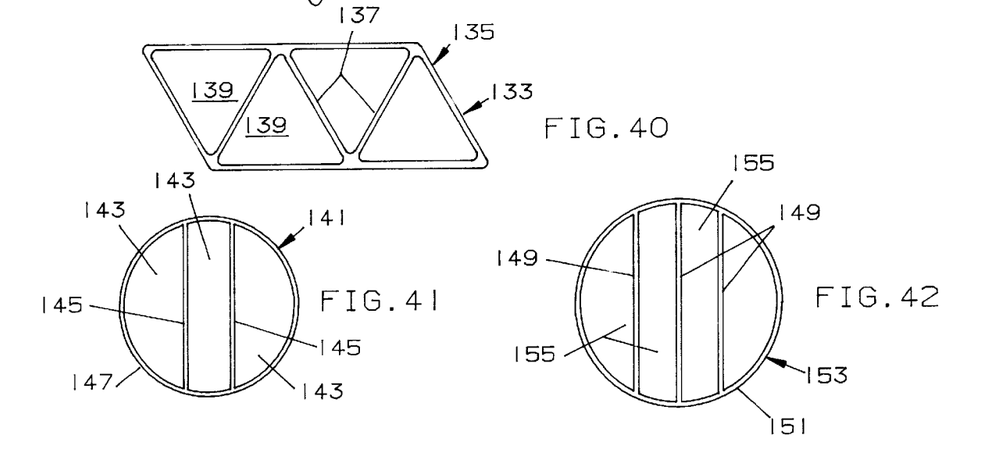
FIG. 40 is a cross sectional view of another embodiment of the invention.
FIG. 41 is a cross sectional view of a modified exhaust pipe having three passages.
FIG. 42 is a cross sectional view of a further modified exhaust pipe having four passages.

In FIG. 39, an exhaust pipe 125 has a triangular shaped outer wall 127. Three interior walls 129 separate interior of the outer wall 127 into four separate passages 131. FIG. 40 shows an exhaust pipe 133 with a trapezoidal outer wall 135, three interior walls 137, and four separate passages 139.

FIG. 41 shows an exhaust pipe 141 with three equal-area passages 143. The pipe 141 has two parallel walls 145 that cooperate with the outer wall 147 to define the passages 143. In FIG. 42, three parallel walls 149 are used with a circular outer wall 151. The result is an exhaust pipe 153 with four equal-area passages 155.

Figure 43:
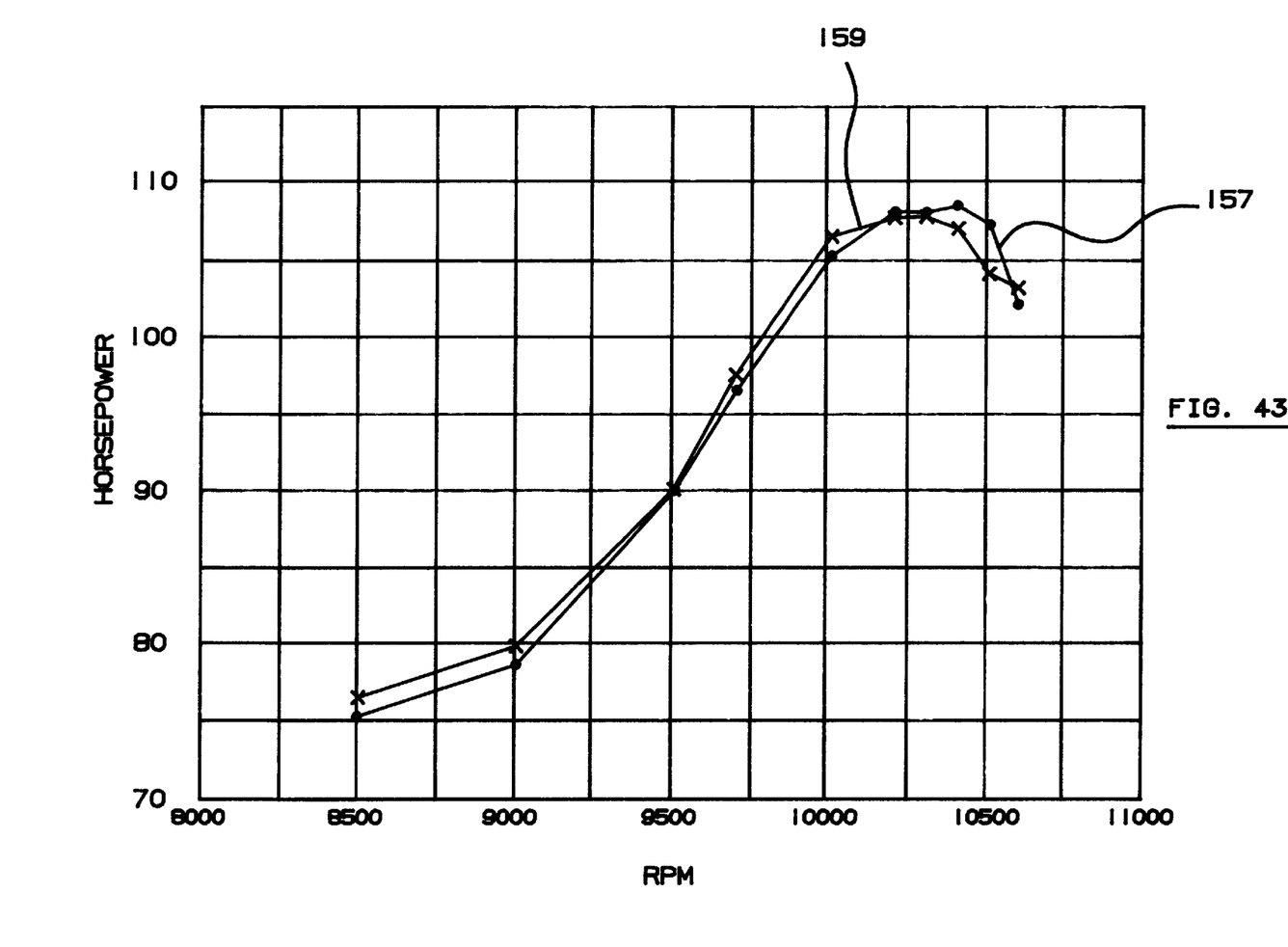
FIG. 43 is a curve showing the performance comparison of two individual exhaust pipes and of a comparable single two-passage exhaust pipe.
Figure 44:
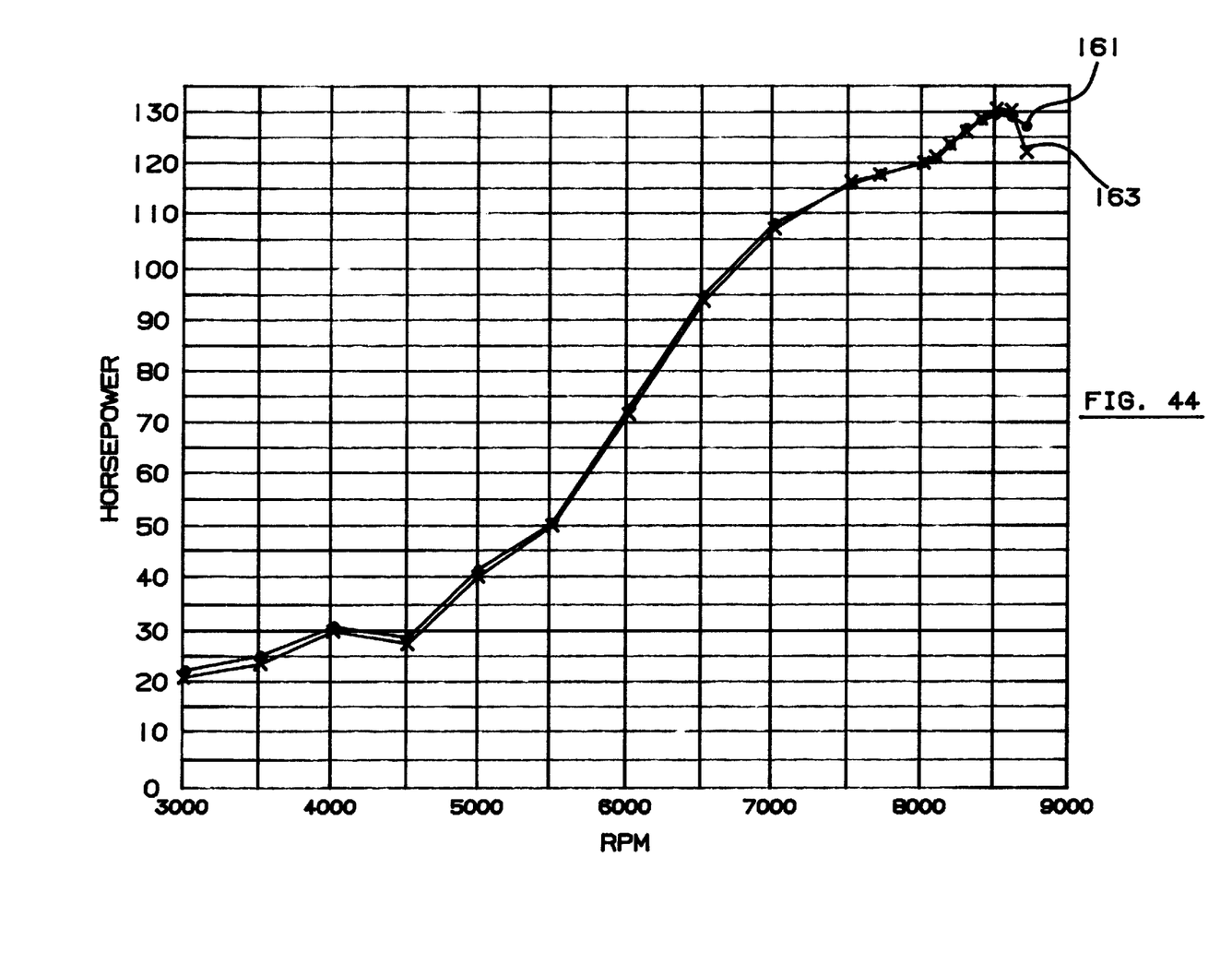
FIG. 44 is a curve showing the performance comparison of three individual exhaust pipes and of a comparable single three-passage exhaust pipe.

FIG. 43 shows a power curve 157 for a typical two-stroke two cylinder internal combustion engine with a two-passage exhaust pipe. FIG. 43 also shows the power curve 159 for the same engine with two conventional exhaust pipes. FIG. 44 shows a power curve 161 for a typical two-stroke three-cylinder engine with a three-passage exhaust pipe according to the invention. In FIG. 44, power curve 163 is for the same engine using three conventional exhaust pipes. For both engines, it is seen that the multi-passage exhaust pipes of the invention, with their non-circular cross sections, perform equally well as the prior individual exhaust pipes. Accordingly, the benefits of the multi-passage exhaust pipe of the invention are available to engine designers without sacrificing performance.

In summary, the results and advantages of internal combustion engines can now be more fully realized. The exhaust system of the invention provides both high performance and flexibility of design. This desirable result comes from using the discovery that a circular cross sectional shape for an exhaust passage is not necessary for proper functioning of an exhaust system. On the contrary, the cross section may have a rectangular, sector, or other cross sectional shape, provided the area is sufficiently large to handle the flow of exhaust gasses. The ability to use non-circular cross sections enables two or more exhaust passages to be incorporated into a single envelope using one or more shared walls. The shared wall construction saves space and material. Further, non-circular cross sections enable the exhaust system to be configured to suit a particular engine and vehicle with much greater flexibility than was possible with prior circular cross sections.

It will also be recognized that in addition to the superior performance of the exhaust system of the invention, its construction is such as to cost less than traditional exhaust systems of the same performance. Moreover, the invention enables the exhaust system for an engine to be tuned for performance for different operating speeds of the engine.

Thus, it is apparent that there has been provided, in accordance with the invention, an exhaust system tuned for performance with shared wall that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In combination with an internal combustion engine having an exhaust port, apparatus for conducting exhaust gasses from the engine to the atmosphere comprising:
   a. an elongated exhaust pipe having first and second ends and an outer wall that defines an interior, and a longitudinally extending plate inside the outer wall that divides the interior thereof into first and second passages that share the plate and that extend between the exhaust pipe first and second ends; and
   b. valve means for selectively directing all the exhaust gasses from the engine exhaust port to a selected one of the exhaust pipe first or second passages.

2. The combination of claim 1 wherein:
   a. the exhaust pipe outer wall comprises a first outer wall located on one side of the plate, and a second outer wall located on the other side of the plate;
   b. the first outer wall has a plurality of first sections that are tuned for performance for a first predetermined speed of the engine;
   c. the second outer wall has a plurality of second sections that are tuned for performance for a second predetermined speed of the engine; and
   d. the valve means directs the exhaust gasses into the first or second passage in response to the operating speed of the engine.

3. The combination of claim 1 wherein:
   a. the first and second outer walls each have plurality of first and second sections, respectively, with respective lengths and cross sectional areas;
   b. the first sections have respective first lengths and cross sectional areas that are tuned for performance for a first operating speed of the engine;
   c. the second sections have respective second lengths and cross sectional areas that are tuned for performance for a second operating speed of the engine;
   d. the valve means directs the exhaust gasses into the first passage when the engine is operating at the first speed; and
   e. the valve means directs the exhaust gasses into the second passage when the engine is operating at the second speed.

* * * * *